United States Patent [19]
Davis

[11] 4,079,908
[45] Mar. 21, 1978

[54] CAMERA SUPPORT APPARATUS

[76] Inventor: Francis W. Davis, R.D. 1, Box 47, Long Eddy, N.Y. 12760

[21] Appl. No.: 769,575

[22] Filed: Feb. 17, 1977

[51] Int. Cl.² .............................................. A45F 3/44
[52] U.S. Cl. ...................................... 248/156; 7/158; 30/344; 248/185; 248/187; 403/79; 403/157
[58] Field of Search ............... 248/156, 185, 186, 187, 248/176, 155, 155.1, 155.5, 530, 532, 87, 85; 403/79, 157; 30/344, 334; 7/1 B, 1 G, 14.1 R; 354/293

[56] References Cited
U.S. PATENT DOCUMENTS

| | | | |
|---|---|---|---|
| 181,206 | 8/1876 | Richardson | 7/1 B |
| 1,508,206 | 9/1924 | Waters | 248/156 |
| 2,016,744 | 10/1935 | Heck | 248/155 |
| 2,441,109 | 5/1948 | Carlson | 248/156 |
| 2,612,334 | 9/1952 | Delamere | 248/532 |
| 3,481,038 | 12/1969 | Cooper | 30/344 |
| 3,810,647 | 5/1974 | Martchenke | 248/187 |
| 3,924,345 | 12/1975 | Sapp | 248/156 |

FOREIGN PATENT DOCUMENTS

| | | | |
|---|---|---|---|
| 1,448,269 | 6/1966 | France | 248/156 |
| 687,588 | 2/1953 | United Kingdom | 248/156 |

Primary Examiner—Marion Parsons, Jr.
Attorney, Agent, or Firm—Charles S. McGuire

[57] ABSTRACT

A camera is fixedly supported in a desired position by providing a support screw, for engagement with the usual threaded opening in the camera base, in association with a sharply pointed member, such as a knife blade, which is inserted into earth, snow, ice, wood, or other supporting material pierceable by the pointed member. The camera support member having the support screw on one end is attached to the tang of the knife blade by a clevis, allowing pivotal movement of the camera to a desired angular position relative to the supporting surface. A hollow, removable handle includes a socket-type wrench for engaging the clevis bolt, and/or another removable element may be used as a screwdriver to engage a slot in the head of the clevis bolt.

5 Claims, 5 Drawing Figures

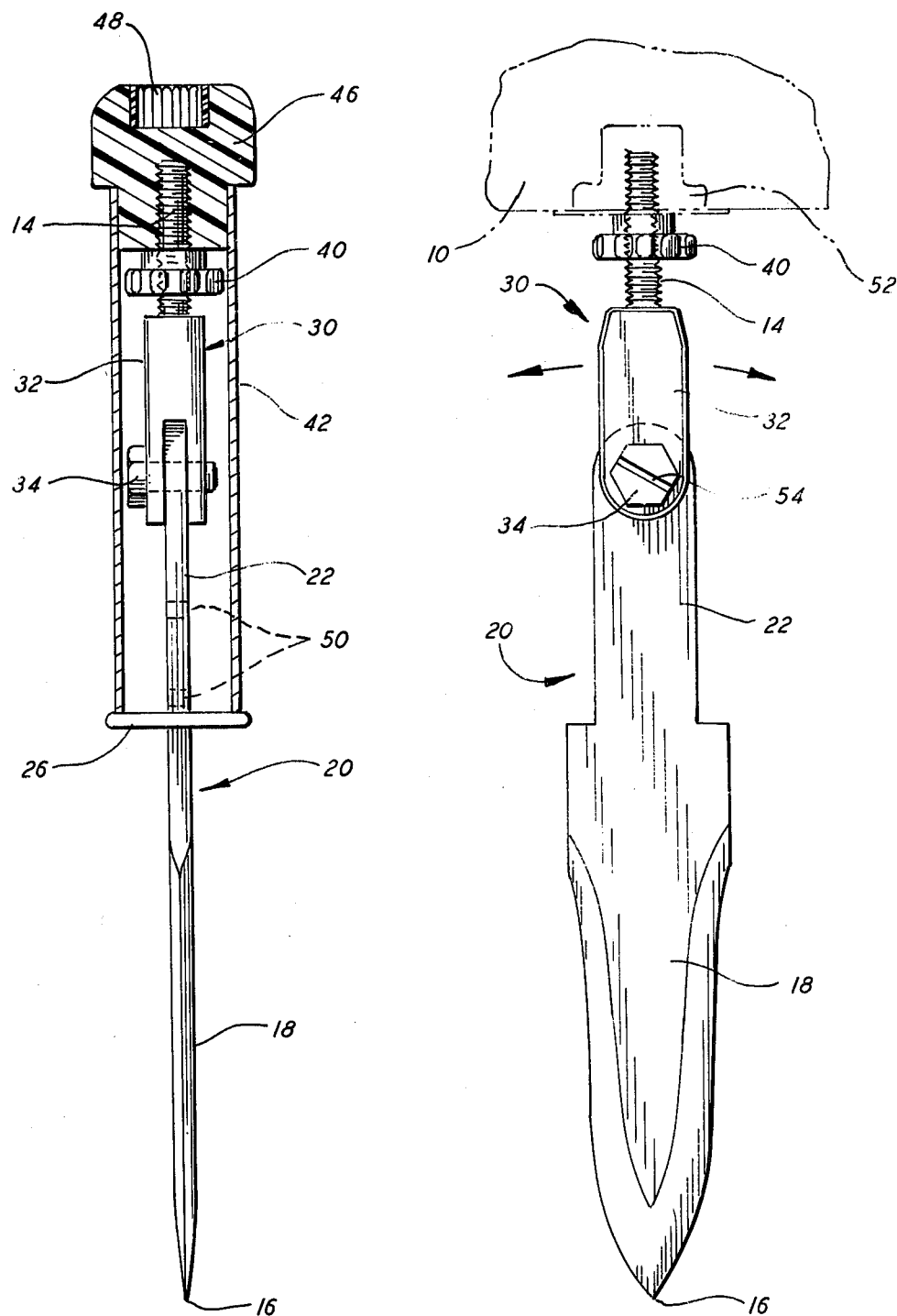

CAMERA SUPPORT APPARATUS

BACKGROUND OF THE INVENTION

The present invention relates to camera supports and, more particularly, to apparatus which involve supporting a camera by means of a knife blade, or other sharply pointed object, which is inserted in earth, snow, or other such supporting materials.

In many types of photography it is desirable to support the camera other than manually. Most portable cameras, both of the still and movie types, are provided with threaded openings in the bottom wall thereof for mounting upon camera support structure having a screw or lug projecting therefrom for engagement with the camera opening. Among the numerous types of camera supports in present use, the most common is the tripod. Although tripods, as well as other conventional camera support structures, are available in a variety of styles and sizes, they are usually either quite bulky or require some time and effort to assemble and erect. Also, conventional supports seldom, if ever, are capable of performing any useful function other than supporting one or more cameras in a desired position.

It is a principal object of the present invention to provide a camera support of compact and uncomplicated construction, which requires no assembly or erection other than attachment to the camera.

Another object is to provide a camera support designed to perform other functions besides supporting a camera.

A further object is to provide means for supporting a camera simply by manual insertion of a sharply pointed member into the earth, snow, ice, wood, or other such supporting material.

In a more general sense, the object of the invention is to provide novel and improved apparatus for supporting a camera in a fixed position.

Other objects will in part be obvious and in part appear hereinafter.

SUMMARY OF THE INVENTION

In accordance with the foregoing objects, the disclosed embodiment of the invention includes a pointed knife blade having pivotally attached to the tang end thereof a support member with a threaded end for engagement in the camera opening. The support member is attached to the tang by a clevis-type connection allowing pivotal movement about the axis of the clevis bolt, which is tightened to fix the relative angular positions of the blade and support member.

A hollow handle, open at one end, is placed in covering relation to the support member and tang, and secured to the threaded end of the support member which engages a threaded opening internally of the closed end of the handle. A separate guard element is preferably engaged between the open end of the handle and a shoulder between the blade and tang portions of the knife. The handle is removed when the device is to be used as a camera support so that the threaded end of the support member may be engaged in the opening provided for such purpose in the camera. The clevis bolt may be loosened and tightened by engagement of the bolt head with a socket in the handle and/or by an edge of the guard member engaging a slot in the bolt head.

BRIEF DESCRIPTION OF THE DRAWINGS

FIGS. 3 and 4 are front and side elevational views, respectively, showing all elements assembled with portions in vertical section; and FIG. 5 is a front elevational view with the handle removed and showing a fragment of a camera in phantom lines.

DETAILED DESCRIPTION

Figure 1:
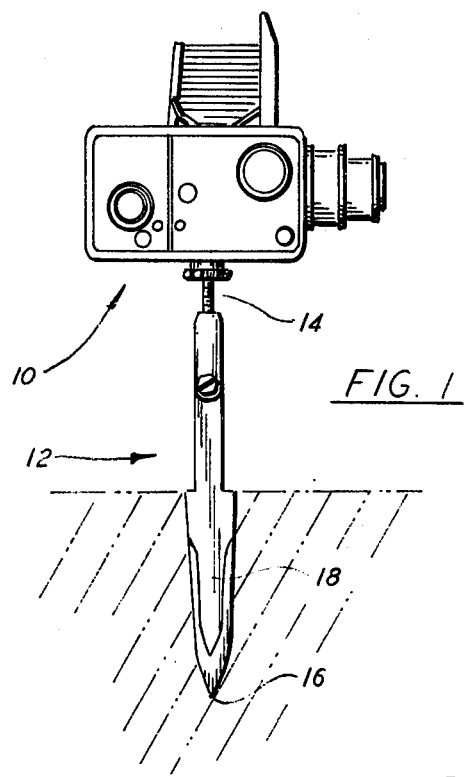
FIG. 1 is an elevational view showing a preferred embodiment of the invention with a camera mounted thereon.

Referring now to the drawings, in FIG. 1 is seen camera 10, conventional in all respects and having the usual threaded opening in the base or lower wall thereof for engagement with a camera support. A preferred embodiment of the camera support of the present invention is shown in FIG. 1, generally denoted by a reference numeral 12 and attached by threaded projection 14 to camera 10. Pointed tip 16 of blade portion 18 is at the end of support 12 opposite threaded projection 14. The device functions to support camera 10 by inserting pointed tip 16 and some or all of blade 18 into a supporting material. It is contemplated that the device will be principally employed outdoors, where blade 18 may easily be embedded in the earth, snow, ice, trees, etc., but the invention is not limited by the type of material, other than that it be pierceable by point 16 and capable of supporting the device and camera. Thus, any references to specific materials such as earth or snow are intended as illustrative, and not in a limiting sense.

Figure 2:
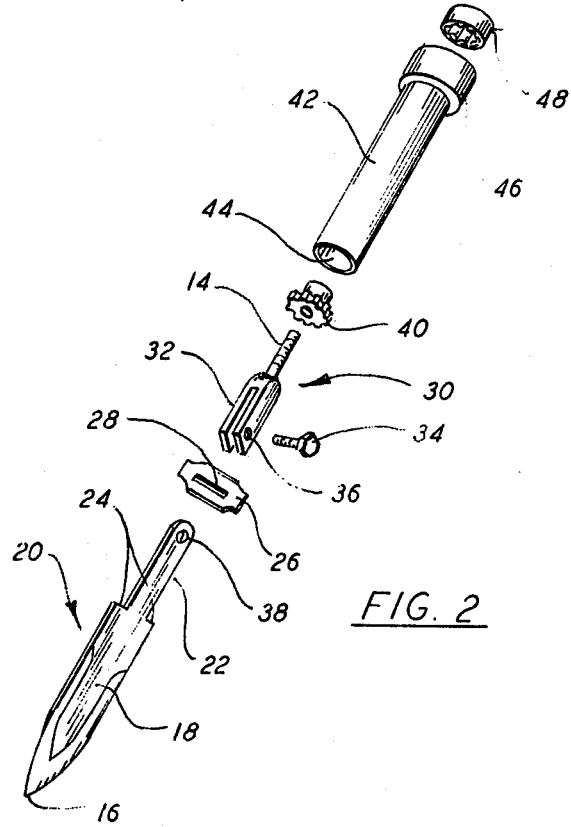
FIG. 2 is an exploded perspective view showing the various elements of the device in disassembled relation.

Turning now to FIG. 2, all elements of the device are shown in exploded perspective form. The pointed member having tip 16 is generally denoted by reference numeral 20 and includes blade portion 18 and tang portion 22. The two portions of member 20 are integrally formed, with blade portion 18 somewhat wider, forming shoulders 24 at the juncture of the two portions. Guard member 26, having central opening 28, may be inserted over tang portion 22 and abut against shoulders 24. Support member 30 includes threaded projection 14 at one end and clevis 32 at the other. Bolt 34 extends through openings 36 and 38 in clevis 32 and tang portion 22, respectively, for engagement in a threaded opening in the opposite leg of the clevis. Camera locking nut 40 is threaded on projection 14. Handle 42 is hollow, being open at end 44 and closed at the other end by member 46 which is cemented or otherwise permanently secured to handle 42. Box end wrench socket 48 is press fitted or otherwise permanently secured within a recess provided for such purpose in member 46.

Figure 3:
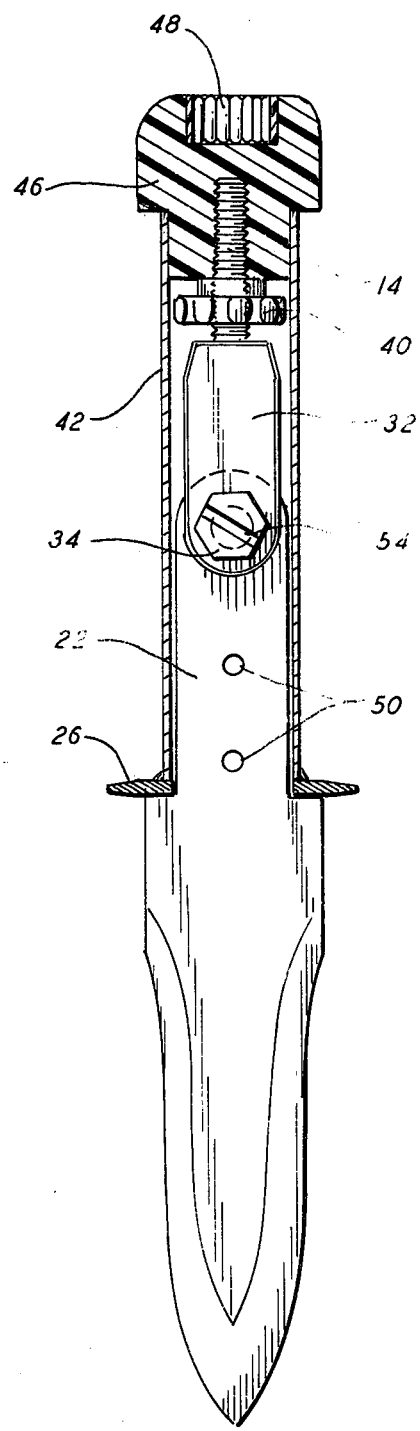

In FIGS. 3 and 4 the elements are shown fully assembled with handle 42 in covering relation to tang portion 22, support member 30, and locking nut 40. The latter is positioned at or near the base of threaded projection 14, and handle 42 is secured by engagement of projection 14 with a threaded opening which may extend partly into or completely through member 46. Relative dimensions of the elements are such that guard member 26 is firmly engaged between open end 44 of handle 42 and shoulders 24 of member 20 when member 46 is secured to threaded projection 14. It is also desirable to position locking nut 40 on projection 14 so that it bears against member 46 when the elements are assembled, thus providing additional support. With the elements so assembled the device has the appearance and function of a hunting knife, or the like, and may be so used. Although blade portion 18 is illustrated as double edged, or of the bayonet type, it may, of course, be single edged, or of other desired configurations, provided that a relatively sharp point is provided on the end for insertion in the supporting material. Openings 50, shown in FIGS. 3 and 4, one or both of which may be internally threaded, may be provided in tang portion 22 for securing thereto elements of shutter release mechanism for operation of a camera supported by the device.

Prior to mounting a camera on the device for support thereby, handle 42 is removed by unscrewing member 46 from engagement with projection 14. The internally threaded opening in the camera wall is normally provided in a metal insert of the type indicated by reference numeral 52 in the fragment of camera 10 shown in FIG. 5. Support member 30 is engaged with the camera, either before or after blade 18 is manually inserted in the supporting material, by threading projection 14 into the opening and rotating nut 40 into firm engagement with camera 10. The angle of elevation of the camera may be adjusted as desired by loosening clevis bolt 34 and rotating support member 30 relative to member 20, as indicated by the arrows in FIG. 5, and retightening bolt 34 with camera 10 in the desired position. Bolt 34 may be loosened and tightened manually, or with the aid of a wrench, such as provided in member 46, and/or by engaging slot 54 in the bolt head with an edge of guard member 26. The latter may, of course, by permanently attached to member 20 if it is not to be used as a separate screwdriver, or for other purposes.

From the foregoing it may be seen that the invention provides a simple and expedient means of supporting a camera in a fixed position. A single, rigid member having a pointed extremity is inserted into the ground, or other supporting material, rather than providing a plurality of such members for resting on the surface, as with tripods and other such conventional camera supports. Furthermore, simply by providing a removable handle, the device is capable of functioning as both a knife and a camera support.

What is claimed is:

1. A support for a camera having a threaded opening in an exterior wall thereof, said support comprising:
    a. a rigid member in the form of a knife blade having a pointed end for insertion in earth, snow, or the like, and a tang portion at the opposite end;
    b. a support member having a threaded screw extending from one end for engagement with the threaded opening in the camera; and
    c. means adjustably pivotally connecting said tang portion attaching the end of said rigid member opposite said pointed end to the end of said support member opposite said one end and;
    d. a camera locking nut threaded on said screw of said support member.

2. The invention according to claim 1 wherein said opposite end of said support member comprises a clevis and said pivotal connection comprises a bolt extending through said clevis and tang portion.

3. The invention according to claim 2 and further including hollow handle means removably positioned in covering relation to said support member and said tang portion of said rigid member.

4. The invention according to claim 3 wherein said handle means is open at one end, for insertion over said support member, and closed at the other end by an element having an internal, threaded opening for engagement with said support member screw to secure said handle means in place.

5. The invention according to claim 4 wherein said bolt includes a head engageable by a socket-type wrench, and said element on said handle means includes an integral socket for engaging said bolt head when said handle means is removed from covering relation with said support member and tang portion.

* * * * *